United States Patent
Hara et al.

(10) Patent No.: US 7,500,363 B2
(45) Date of Patent: Mar. 10, 2009

(54) FAILURE DETECTING DEVICE FOR SUPERCHARGING-PRESSURE CONTROL MEANS IN SUPERCHARGING DEVICE OF ENGINE

(75) Inventors: Hirofumi Hara, Saitama (JP); Atsuhiro Miyauchi, Saitama (JP); Kazuhiko Imamura, Saitama (JP); Takashi Kon, Saitama (JP); Yoshinori Andou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 41 days.

(21) Appl. No.: 11/878,604

(22) Filed: Jul. 25, 2007

(65) Prior Publication Data

US 2008/0022679 A1 Jan. 31, 2008

(30) Foreign Application Priority Data

Jul. 25, 2006 (JP) ............................. 2006-201609

(51) Int. Cl.
*F02B 33/00* (2006.01)

(52) U.S. Cl. ..................... 60/611; 60/602; 123/561

(58) Field of Classification Search ............. 60/611, 60/602; 123/561
See application file for complete search history.

(56) References Cited

U.S. PATENT DOCUMENTS

| 4,277,830 A | * | 7/1981 | Reid et al. ............... 701/99 |
| 4,774,812 A | * | 10/1988 | Hitomi et al. ............. 60/611 |
| 5,694,899 A | * | 12/1997 | Chvatal et al. ............ 60/611 |
| 6,658,847 B2 | * | 12/2003 | Shirakawa ................ 60/602 |
| 6,785,604 B2 | * | 8/2004 | Jacobson ................. 701/114 |
| 2006/0248889 A1 | * | 11/2006 | Sagisaka et al. ............ 60/602 |

FOREIGN PATENT DOCUMENTS

| JP | 2003-120304 | 4/2003 |
| JP | 2003120304 A | * 4/2003 |

* cited by examiner

*Primary Examiner*—Thomas E Denion
*Assistant Examiner*—Mary A Davis
(74) *Attorney, Agent, or Firm*—Squire, Sanders & Dempsey L.L.P.

(57) ABSTRACT

When an engine load QC is equal to or larger than a predetermined value, an acceleration-state determiner determines that a turbine is in an acceleration state, and a supercharging-pressure-control-state determiner determines that supercharging-pressure controller (a bypass valve, a wastegate, and a variable flap) of a turbocharger are in a maximum supercharging pressure control state (a closed valve state), i.e., when a delay coefficient α of the turbocharger calculated by a delay-coefficient calculator on the basis of an actual supercharging pressure πc and a convergent value πc* of a supercharging pressure calculated by a convergent-value calculator indicates a value peculiar to the turbocharger, a failure of the supercharging-voltage controller is determined on the basis of the delay coefficient α. Thus, it is possible to secure a high failure detection accuracy, and increase a frequency of performing failure detection even when the engine load QC suddenly changes to cause a delay in a response of the supercharging pressure πc.

10 Claims, 18 Drawing Sheets

FAILURE DETECTING DEVICE FOR SUPERCHARGING-PRESSURE CONTROL MEANS IN SUPERCHARGING DEVICE OF ENGINE

BACKGROUND OF THE INVENTION

1. Field of the Invention

The present invention relates to a failure detecting device for supercharging-pressure control means in a supercharging device of an engine, the supercharging device comprising: a turbocharger for supercharging the engine; supercharging-pressure control means for controlling a supercharging pressure in a supercharging intake air passage downstream of the turbocharger; engine-load detecting means for detecting an engine load; and supercharging-pressure detecting means for detecting the supercharging pressure in the supercharging intake air passage.

2. Description of Related Art

Japanese Patent Application Laid-open No. 2003-120304 discloses a device which determines abnormality of the turbocharger by comparing a reference supercharging pressure preset corresponding to an engine load with an actual supercharging pressure detected by a supercharging pressure sensor, when a nozzle vane for controlling a supercharging pressure generated by a turbocharger of an engine is in a maximum or minimum opening-degree position and the engine is in a low-rotational-speed low-load region or a high-rotational-speed high-load region.

In the conventional turbocharger, there is recognized a time lag (so-called turbo-lag) between the reference supercharging pressure preset according to the engine load and the actual supercharging pressure detected by the supercharging pressure sensor. Therefore, as in the above-described conventional device, a device that determines a failure of the turbocharger on the basis of the comparison between the reference supercharging pressure and the actual supercharging pressure has a possibility to erroneously determine that the turbocharger has failed although the turbocharger is normal, when the engine load suddenly changes to cause a time lag in the response of the actual supercharging pressure which leads to a difference between the reference supercharging pressure and the actual supercharging pressure.

SUMMARY OF THE INVENTION

The present invention has been achieved to in view of the circumstances, and it is an object of the present invention to accurately detect a failure of supercharging-pressure control means and increase frequency of failure detection, by taking into consideration a response delay of a supercharging pressure of a turbocharger.

In order to achieve the above object, according to a first feature of the present invention, there is provided a failure detecting device for supercharging-pressure control means in a supercharging device of an engine, the supercharging device comprising: a turbocharger for supercharging the engine; supercharging-pressure control means for controlling a supercharging pressure in a supercharging intake air passage downstream of the turbocharger; engine-load detecting means for detecting an engine load; and supercharging-pressure detecting means for detecting the supercharging pressure in the supercharging intake air passage, wherein the failure detecting device comprises: acceleration-state determining means for determining whether a turbine is in an acceleration state on the basis of the engine load detected by the engine-load detecting means; supercharging-pressure-control-state determining means for determining whether the supercharging-pressure control means is in a maximum supercharging pressure control state for maximizing the supercharging pressure in the supercharging intake air passage; failure-detection permitting means for permitting failure detection for the supercharging-pressure control means, when the engine-load detecting means detects an engine load equal to or larger than a predetermined value, the acceleration-state determining means determines that the turbine is in the acceleration state, and the supercharging-pressure-control-state determining means determines that the supercharging-pressure control means is in the maximum supercharging pressure control state; convergent-value calculating means for calculating a convergent value of the supercharging pressure on the basis of the engine load detected by the engine-load detecting means, when the failure-detection permitting means permits the failure detection; delay-coefficient calculating means for calculating a delay coefficient of the turbocharger on the basis of the supercharging pressure detected by the supercharging-pressure detecting means and the convergent value of the supercharging pressure calculated by the convergent-value calculating means; and failure determining means for determining whether a failure of the supercharging-pressure control means has occurred on the basis of the delay coefficient calculated by the delay-coefficient calculating means.

With this arrangement, when the engine load is equal to or larger than the predetermined value, the turbine is in the acceleration state, and the supercharging-pressure control means of the turbocharger is in the maximum supercharging pressure control state, i.e., when the delay coefficient of the turbocharger calculated from the actual supercharging pressure and the convergent values of the supercharging pressure indicates a value peculiar to the turbocharger, the failure detecting device determines, on the basis of the delay coefficient, that the supercharging-pressure control means has failed. Thus, even when the engine load suddenly changes to cause a delay in the response of the supercharging pressure, it is possible to secure a high failure detection accuracy and increase frequency of the failure detection.

According to a second feature of the present invention, in addition to the first feature, the engine-load detecting means detects the engine load on the basis of an intake air quantity of the engine; and the failure detecting device further comprises convergent-value correcting means for correcting the convergent value of the supercharging pressure according to at least one of an atmospheric pressure, an intake air temperature, an exhaust gas pressure, and an exhaust gas temperature.

With this arrangement, the convergent value of the supercharging pressure is corrected according to at least one of the atmospheric pressure, the intake air temperature, the exhaust pressure, and the exhaust temperature. Thus, calculation accuracy of the convergent value of the supercharging pressure is improved to improve accuracy of the failure detection.

According to a third feature of the present invention, in addition to the first feature, the failure-detection permitting means cancels the failure detection for the supercharging-pressure control means when a retard amount in an ignition timing of the engine is equal to or larger than a predetermined value.

When the ignition timing of the engine is retarded, exhaust energy with respect to the engine load increases, thereby changing the convergent value of the supercharging pressure. With this arrangement, however, the failure detection for the super-charging pressure control means is prohibited when the retard amount is equal to or larger than the predetermined value, thereby accurately calculating the convergent value of the supercharging pressure to improve the accuracy of the failure detection.

According to a fourth feature of the present invention, in addition to the first feature, the failure-detection permitting means cancels the failure detection when the acceleration-state determining means determines that the turbine is in a deceleration state.

With this arrangement, the failure detection is canceled when it is determined that the turbine is in the deceleration state. Thus, it is possible to correctly calculate a delay coefficient of the supercharging pressure by not performing the failure detection in the deceleration state in which the delay coefficient is different from that in the acceleration state of the turbine.

According to a fifth feature of the present invention, in addition to the first feature, the failure-detection permitting means cancels the failure detection by the acceleration-state determining means until a predetermined time elapses after the determination as to whether the turbine is in the deceleration state is finished.

Until the predetermined time elapses after the determination of the deceleration state of the turbine is finished, the delay coefficient of the supercharging pressure is different even in the acceleration state because of an influence of inertia of the turbine. With this arrangement, however, it is possible to correctly calculate the delay coefficient by not performing the failure detection during that time.

A second intake passage 21 of an embodiment corresponds to the supercharging intake passage of the present invention. An air bypass valve 29, a wastegate 42, and a variable flap 48 of the embodiment correspond to the supercharging-pressure control means of the present invention. An intake air quantity QC of an engine of the embodiment corresponds to the engine load of the present invention. P3 pressure detecting means Sa and atmospheric-pressure detecting means Sb of the embodiment correspond to the supercharging-pressure detecting means of the present invention. Intake-air-quantity detecting means SC of the embodiment corresponds to the engine-load detecting means of the present invention. A pressure ratio $\pi C$ of the embodiment corresponds to the supercharging pressure of the present invention. A target pressure ratio $\pi C^*$ of the embodiment corresponds to the convergent value of the supercharging pressure of the present invention.

The above-mentioned object, other objects, characteristics, and advantages of the present invention will become apparent from a preferred embodiment, which will be described in detail below by reference to the attached drawings.

DESCRIPTION OF THE PREFERRED EMBODIMENT

Figure 1:
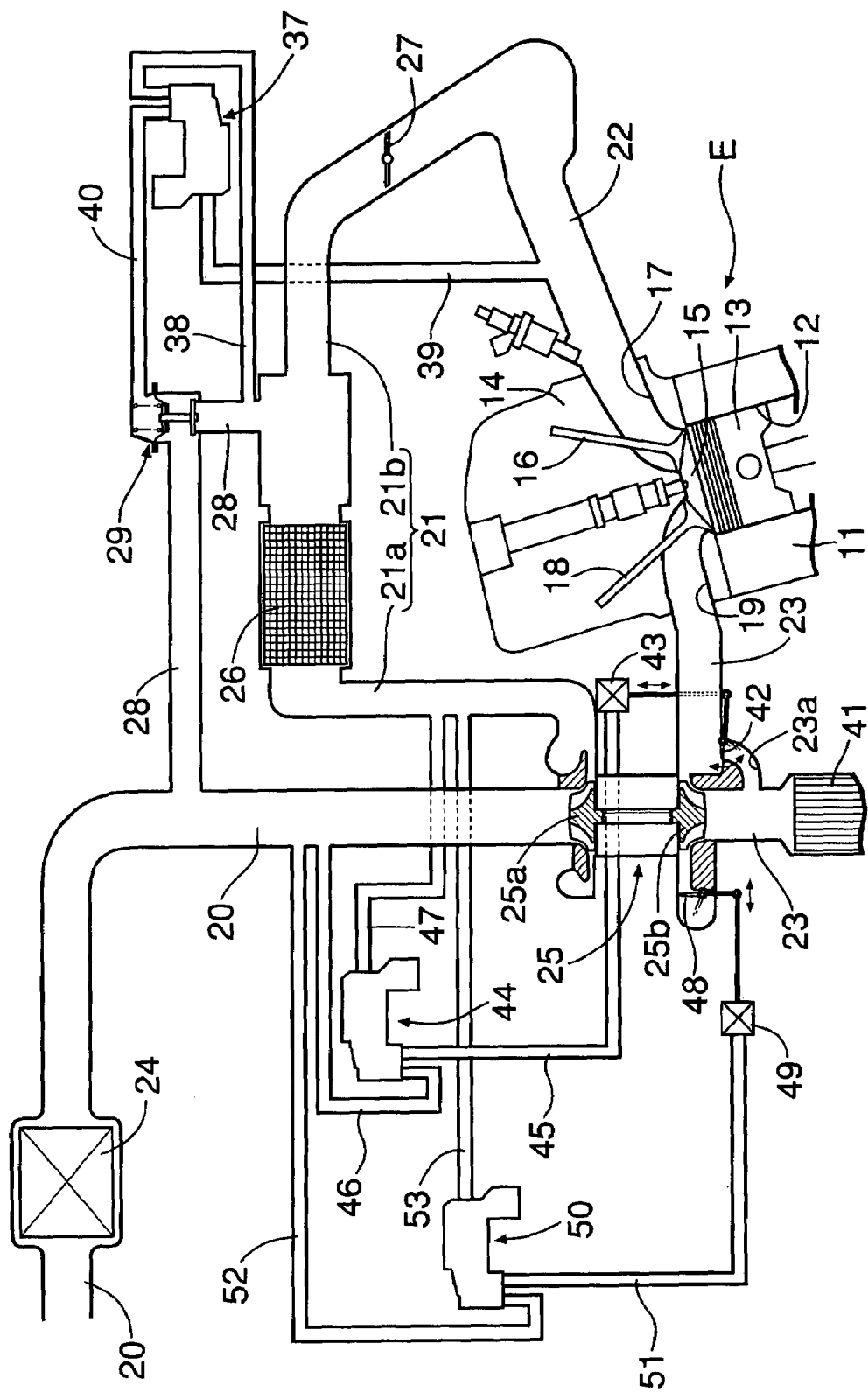
FIG. 1 is a diagram showing an intake system of an engine including a turbocharger according to an embodiment of the present invention.
Figure 2:
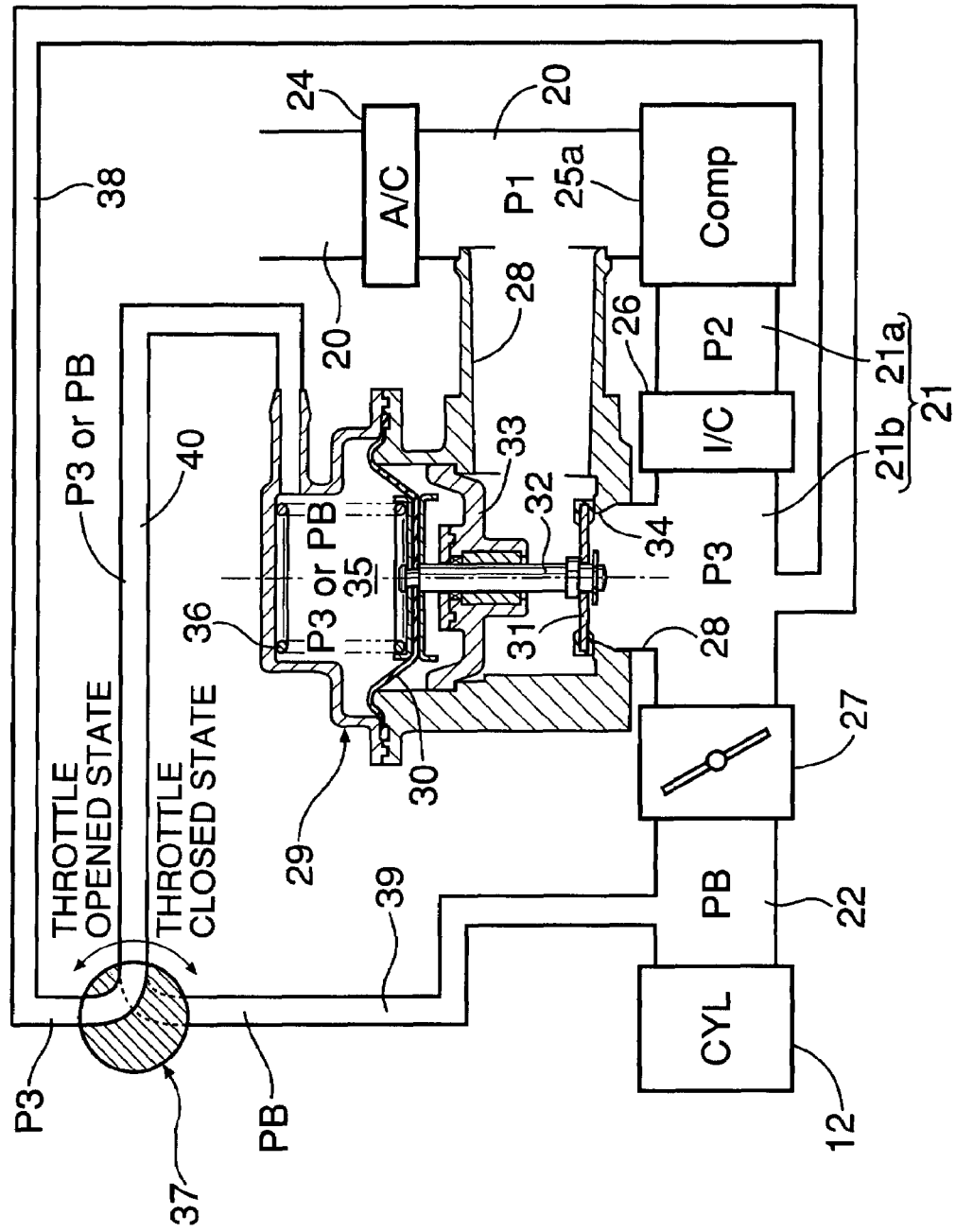
FIG. 2 is a diagram showing a structure of an air bypass valve.

As shown in FIGS. 1 and 2, an engine E includes a piston 13 that slidably fits in a cylinder 12 provided in a cylinder block 11. An intake port 17 and an exhaust port 19 communicate with a combustion chamber 15 formed between an upper surface of the piston 13 and a lower surface of a cylinder head 14. The intake port 17 is opened and closed by an intake valve 16. The exhaust port 19 is opened and closed by an exhaust valve 18. From an upstream side to a downstream side in a flowing direction of an intake air, a first intake passage 20 is connected to a second intake passage 21, which is connected to a third intake passage 22, which is connected to the intake port 17. An exhaust passage 23 is connected to the exhaust port 19.

An air cleaner 24 is arranged in the first intake passage 20. A compressor 25a of a turbocharger 25 is arranged between the first intake passage 20 and the second intake passage 21. An intercooler 26 is arranged between an upstream section 21a and a downstream section 21b of the second intake passage 21. A throttle valve 27 is arranged between the second intake passage 21 and the third intake passage 23. A turbine 25b of the turbo charger 25 is arranged in the exhaust passage 23.

A pressure in the first intake passage 20 is defined as a P1 pressure, a pressure in the upstream section 21a of the second intake passage 21 is defined as a P2 pressure, a pressure in the downstream section 21b of the second intake passage 21 is defined as a P3 pressure, and a pressure in the third intake passage 22 is defined as a PB pressure.

The first intake passage 20 provided downstream the air cleaner 24 and the downstream section 21b of the second intake passage 21 provided between the intercooler 26 and the throttle valve 27 are connected to each other by a bypass passage 28. An air bypass valve 29 is arranged in an intermediate portion of the bypass passage 28. The air bypass valve 29 includes a diaphragm 30, a valve body 31, a rod 32 connected at opposite ends thereof to the diaphragm 30 and the valve body 31, a guide member 33 that slidably guides the rod 32, a valve seat 34 on which the valve body 31 can be seated, a pressure chamber 35 that faces the diaphragm 30 on one side thereof, and a valve spring 36 which is arranged in the pressure chamber 35 to urge the diaphragm 30 downward (in a direction in which the valve body 31 is seated on the valve seat 34).

A control valve 37 comprises a solenoid valve that controls opening and closing of the air bypass valve 29. The control valve 37 is connected to the downstream section 21b of the second intake passage 21 via a first communication path 38, is connected to the third intake passage 22 via a second communication path 39, and communicates with the pressure chamber 35 of the air bypass valve 29 via a third communication path 40.

The control valve 37 is switched corresponding to a throttle opening degree. When the throttle valve 27 is open, the control valve 37 causes the first communication path 38 to communicate with the third communication path 40, thereby introducing the P3 pressure in the downstream section 21b of the second intake passage 21 into the pressure chamber 35 of the air bypass valve 29. When the throttle valve 27 is closed, the control valve 37 causes the second communication path 39 to communicate with the third communication path 40, thereby introducing the PB pressure in the third intake passage 22 into the pressure chamber 35 of the air bypass valve 29.

A condition under which the control valve 37 causes the second communication path 39 to communicate with the third communication path 40, thereby introducing the PB pressure in the third intake passage 22 into the pressure chamber 35 of the air bypass valve 29, is any one of the following.

(a) A throttle opening degree is equal to or smaller than an idling determination value (a fully closed state of the throttle).
(b) A supercharging pressure ratio is equal to or larger than a predetermined value (an excessive supercharging state).
(c) A rate of change in the throttle opening degree is equal to or larger than a predetermined value in a throttle valve closing direction (a suddenly closed state of the throttle valve).

Therefore, when the throttle valve 27 is open, i.e., when the turbocharger 25 is performing supercharging, the relatively large P3 pressure acts on the pressure chamber 35 and this downward P3 pressure cancels the upward P3 pressure that urges the valve body 31 in the valve opening direction. Thus, the valve body 31 is seated on the valve seat 34 by an elastic force of the valve spring 36 to close the air bypass valve 29. As a result, the intake air compressed by the turbocharger 25 is efficiently supplied to the cylinder 12 of the engine E.

When the rate of change in the throttle opening degree in the throttle valve closing direction is equal to or larger than the predetermined value (when the throttle valve 27 is suddenly closed), the PB pressure is introduced into the pressure chamber 35 by the control valve 37. At this time, in a state in which an intake air quantity of the second intake passage 21 is large and the P3 pressure is high, when the throttle valve 27 is suddenly closed, the P3 pressure in the second intake passage 21 instantaneously rises to a higher pressure and the PB pressure downstream the throttle valve 37 suddenly falls. Thus, a pressure difference between the P3 pressure and the PB pressure increases. Then, a combined force of the downward PB pressure and the elastic force of the valve spring 36 decreases to be smaller than the P3 pressure that urges the valve body 31 in the valve opening direction, thereby opening the air bypass valve 29.

As a result, the intake air compressed by the turbocharger 25 is returned from the second intake passage 21 to the first intake passage 20 via the bypass passage 28 and the air bypass valve 29. Thus, it is possible to prevent a pressure in the second intake passage 21 between the compressor 25a of the turbocharger 25 and the throttle valve 27 from becoming excessively large, thereby preventing occurrence of surging to protect the compressor 25a.

Besides when the throttle valve 27 is closed, the air bypass valve 29 is controlled to open when a supercharging pressure of the turbocharger 25 rises to be equal to or higher than a predetermined value and when the opening degree of the throttle valve 27 suddenly decreases.

Figure 3:
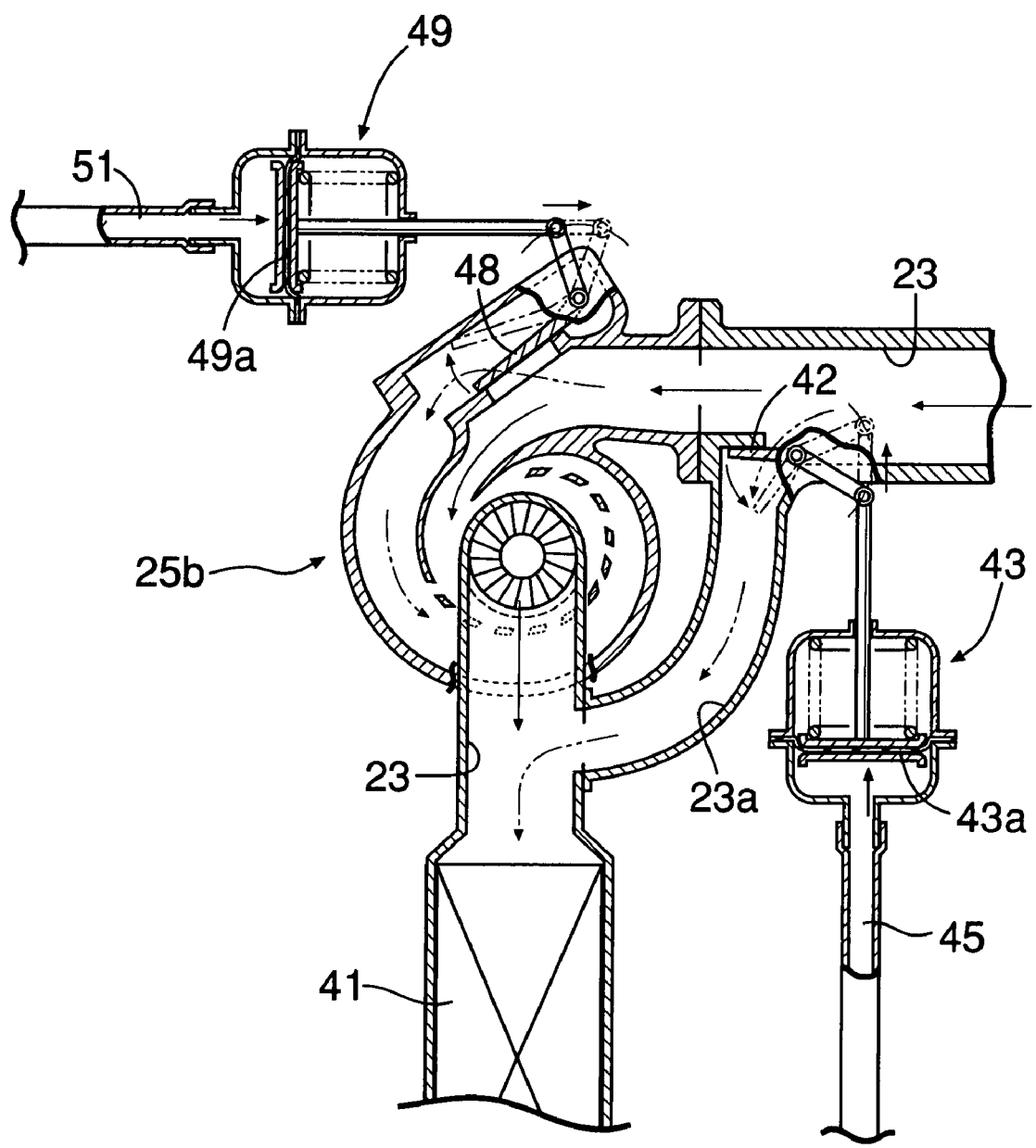
FIG. 3 is a diagram showing structures of a wastegate and a variable flap.

As shown in FIGS. 1 and 3, a wastegate 42 is provided in the exhaust passage 23 so that exhaust gas flowing through the exhaust passage 23 bypasses the turbocharger 25 to directly escape to an exhaust gas purification catalyst 41. A control valve 44 controls actuation of a wastegate actuator 43 which drives the wastegate 42 to open and close. The control valve 44 communicates with the wastegate actuator 43 via a fourth communication path 45, communicates with the first intake passage 20 via a fifth communication path 46, and communicates with the upstream section 21a of the second intake passage 21 via a sixth communication path 47. When the control valve 44 supplies a relatively high P2 pressure in the upstream section 21a of the second intake passage 21 to the wastegate actuator 43, a diaphragm 43 of the wastegate actuator 43 operates to open the wastegate 42. Then, an excess exhaust gas bypasses the turbine 25b of the turbocharger 25 via the bypass passage 23a in order to cause a supercharging pressure to coincide with a target supercharging pressure.

A variable flap 48 is provided in the turbocharger 25 so as to control a flow rate of the exhaust gas by changing a flow path area through which an exhaust gas supplied to the turbine 25b. A control valve 50 controls actuation of a variable flap actuator 49 which drives the variable flap 48 to open and close. The control valve 50 communicates with the variable flap actuator 49 via a seventh communication path 51, communicates with the first intake passage 20 via an eighth communication path 52, and communicates with the upstream portion 21a of the second intake passage 21 via a ninth communication path 53. When the control valve 50 supplies the relatively high P2 pressure in the upstream portion 21a of the second intake passage 21 to the variable flap actuator 49, a diaphragm 49a of the variable flap actuator 49 operates to open the variable flap 48. Consequently, in the engine E, both a high torque in a low engine rotational speed region and a high power in a high engine rotational speed region are realized.

Figure 4:
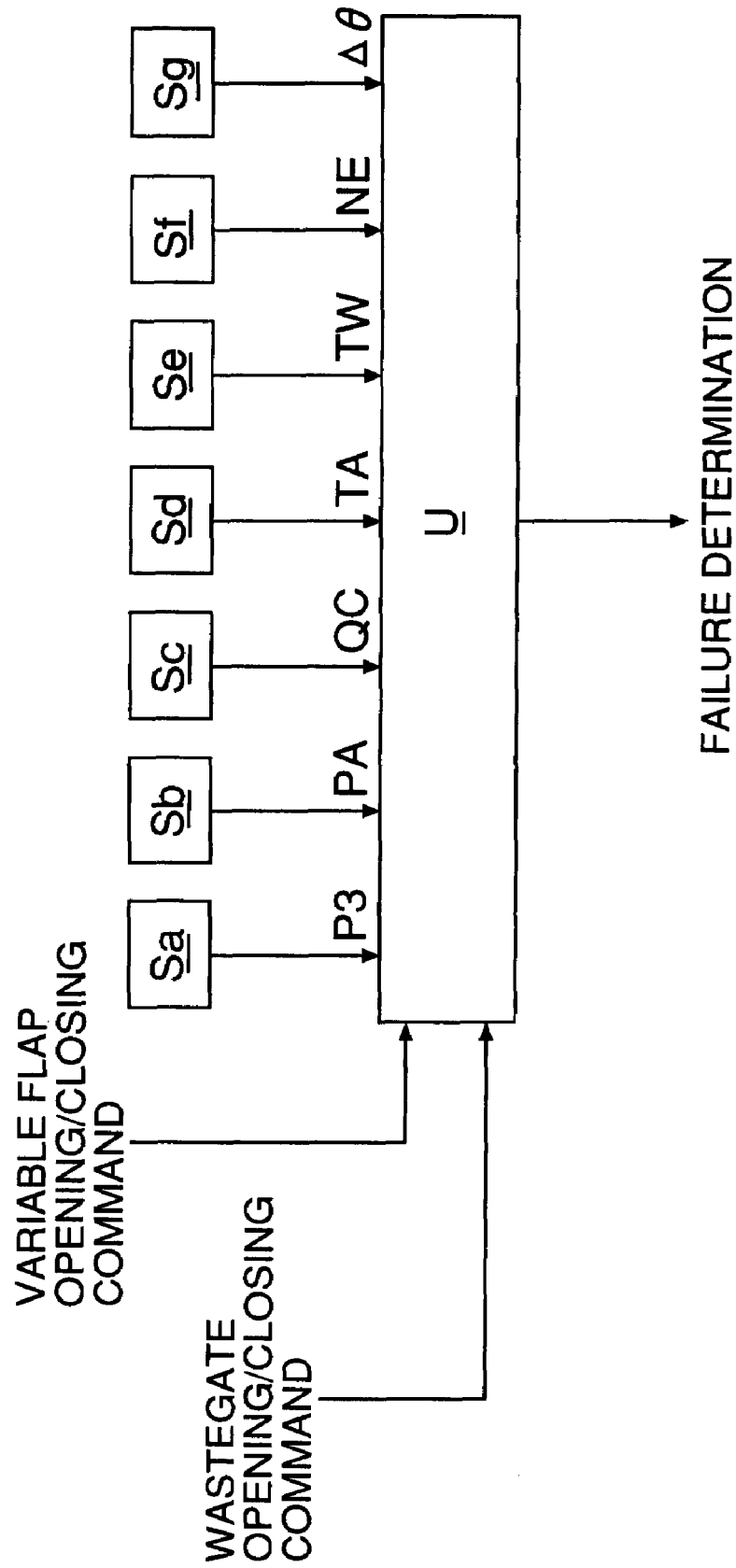
FIG. 4 is a diagram showing a signal inputted to an electronic control unit.

As shown in FIG. 4, connected to an electronic control unit U that detects a valve opening failure where the air bypass valve 29, the wastegate 42 or the variable flap 48 does not close, are P3 pressure detecting means Sa for detecting the P3 pressure in the downstream portion 21b of the second intake passage 21; atmospheric-pressure detecting means Sb for detecting an atmospheric pressure PA; intake-air-quantity detecting means Sc for detecting an intake air quantity QC that passes through the first intake passage 20 downstream of the air cleaner 24; intake-air-temperature detecting means Sd for detecting an intake air temperature TA of the third intake passage 22; cooling-water-temperature detecting means Se for detecting a cooling water temperature TW; engine-rotational-speed detecting means Sf for detecting an engine rotational speed NE; and ignition-retard-amount detecting means Sg for detecting an ignition retard amount $\Delta\theta$ of the engine E. Also, opening and closing commands for the wastegate 42 and the variable flap 48 are inputted to the electronic control unit U.

Figure 5:
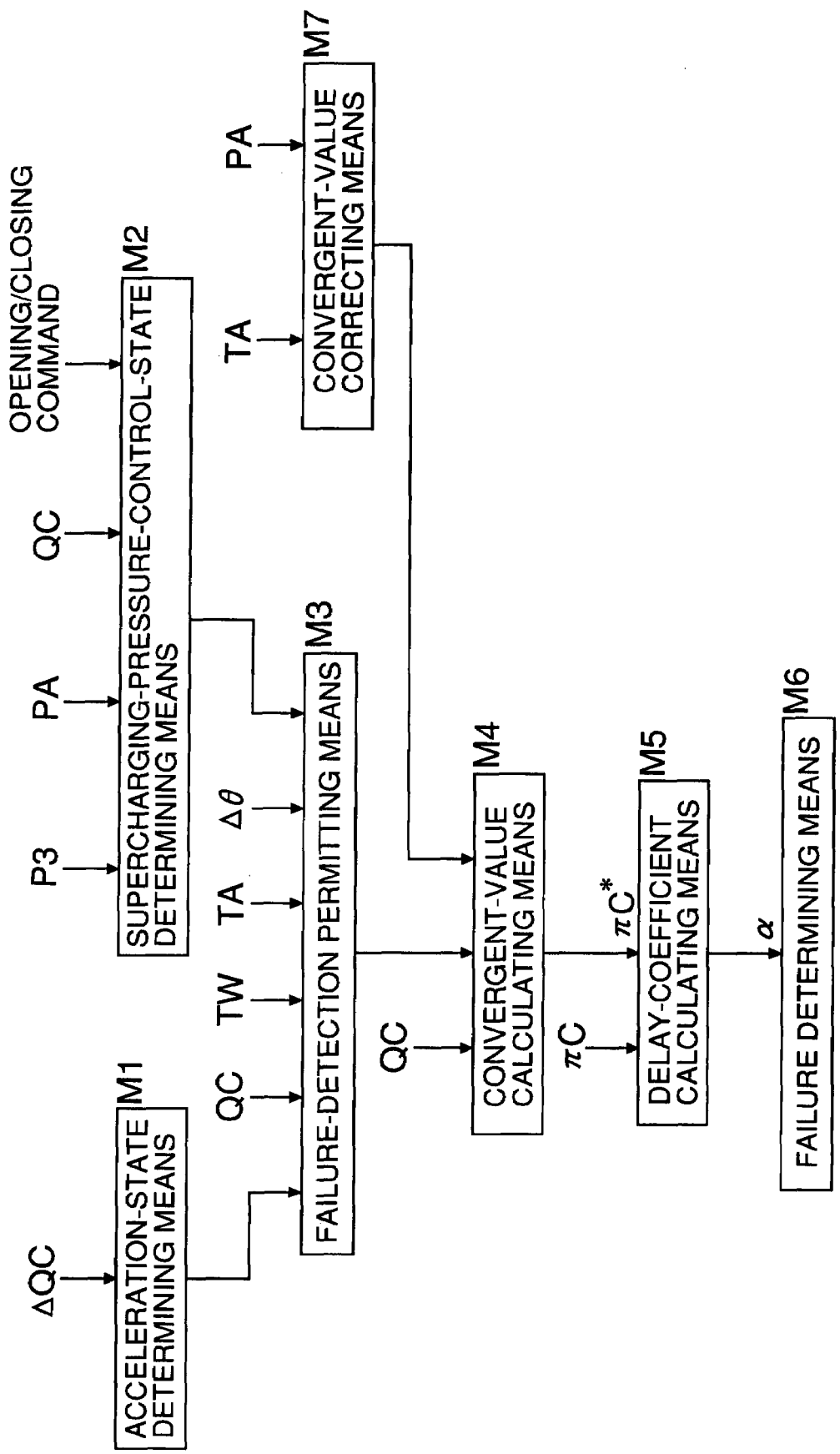
FIG. 5 is a block diagram of functions of the electronic control unit.

As shown in FIG. 5, the electronic control unit U comprises: acceleration-state determining means M1; supercharging-pressure-control-state determining means M2; failure-detection permitting means M3, convergent-value calculating means M4; delay-coefficient calculating means M5; failure determining means M6; and convergent-value correcting means M7.

Next, the operation of the embodiment of the present invention having the above-described structure will be described.

When there occurs a valve opening failure where any of the air bypass valve 29, the wastegate 42 and the variable flap 48 is stuck in a valve opening position, a desired supercharging pressure is not obtained to impair the function of the turbocharger 25. Thus, it is required to detect such a valve opening failure. When the turbocharger 25 operates, an actual pressure ratio $\pi C$ between pressures before and behind the compressor 25a has a first-order lag due to so-called turbo lag with respect to a target pressure ratio $\pi C^*$ that should be reached after shift to a steady state. If all the air bypass valve 29, the wastegate 42 and the variable flap 48 are closed, the delay coefficient $\alpha$ is constant. However, if there occurs the valve opening failure where the air bypass valve 29, the wastegate 42 or the variable flap 48 does not open, the delay coefficient $\alpha$ changes.

Figure 6:
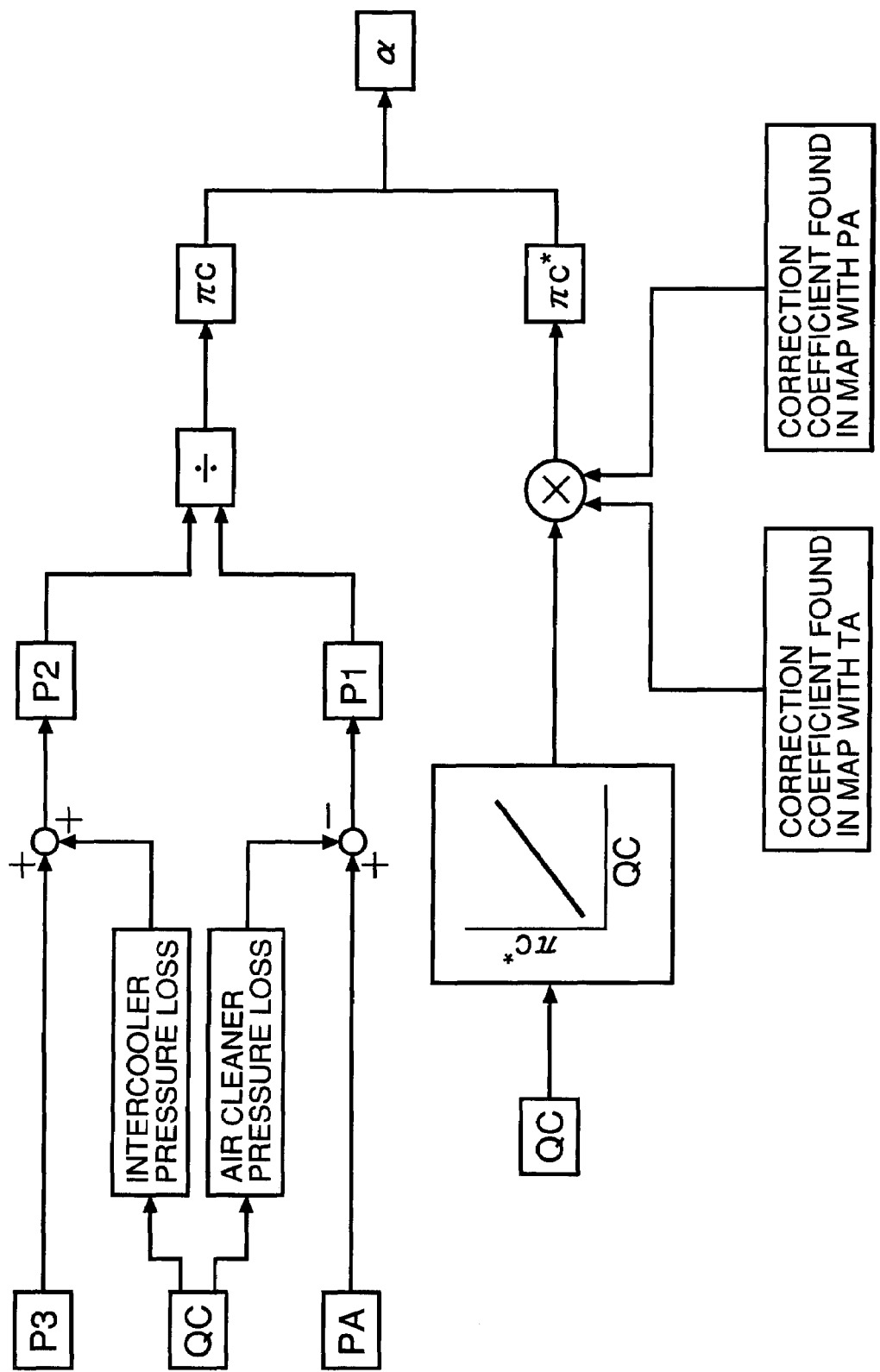
FIG. 6 is a schema showing a method of failure detection.

As apparent from FIGS. 2 and 6, the pressure ratio $\pi C$ between pressures before and behind the compressor 25a is given by $\pi C = P2/P1$. The P2 pressure is a pressure in the upstream section 21a of the first intake passage 21, and can be calculated by adding a pressure loss of the intercooler 26 to the P3 pressure of the downstream section 21b of the first intake passage 21 detected by the P3 pressure detecting means Sa. The P1 pressure can be calculated by subtracting a pressure loss of the air cleaner 24 from the atmospheric pressure PA detected by the atmospheric-pressure detecting means Sb.

The target pressure ratio $\pi C^*$ can be estimated by map-search with the intake air quantity QC detected by the intake-air-quantity detecting means Sc, i.e., with a quantity of air passing through the compressor 25a of the turbocharger 25. The target pressure ratio $\pi C^*$ estimated by the map-search is corrected on the basis of the intake air temperature TA detected by the intake-air-temperature detecting means Sd and the cooling water temperature TW detected by the cooling-water temperature detecting means Se.

The delay coefficient $\alpha$, which is a parameter for performing failure determination, is calculated from the actual pressure ratio $\pi C$ and the target pressure ratio $\pi C^*$.

Figure 7:
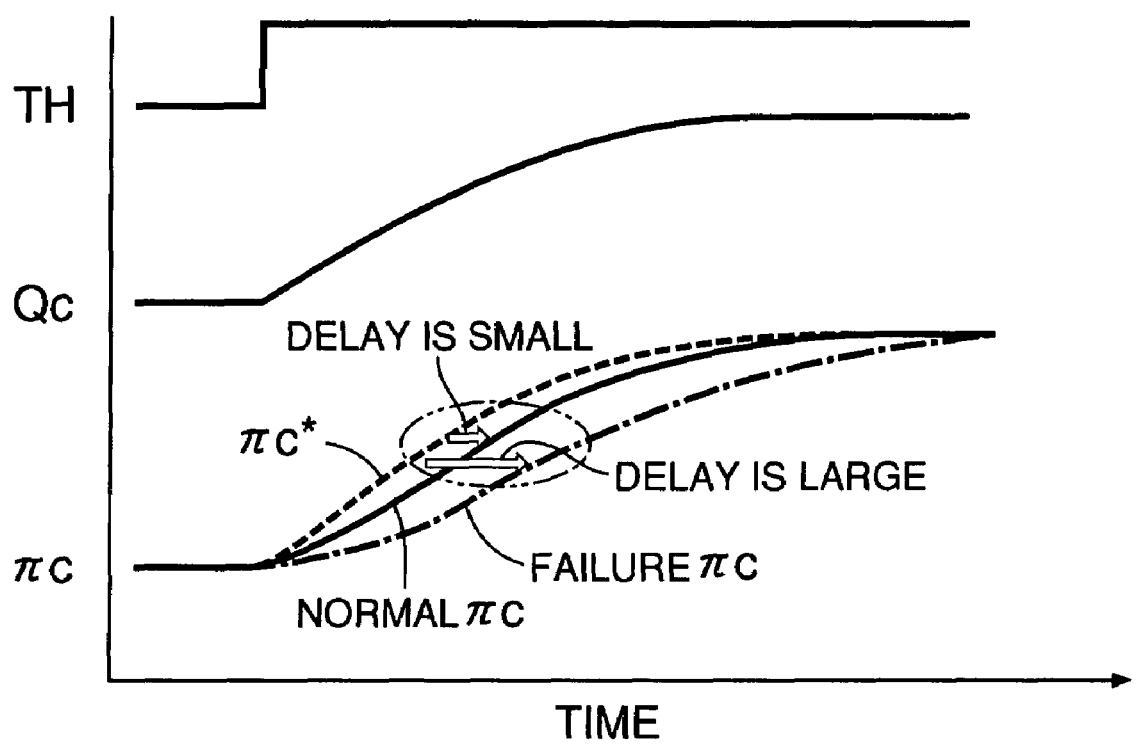
FIG. 7 is a graph showing a target pressure ratio $\pi C^*$ and an actual pressure ratio $\pi C$.

In FIG. 7, when a throttle opening increases stepwise, correspondingly the intake air quantity QC of the air passing through the compressor 25a of the turbocharger 25 gradually increases, and also the target pressure ratio $\pi C^*$ increases in the same tendency as that in the increase of the intake air quantity QC. If all the air bypass valve 29, the wastegate 42 and the variable flap 48 are normally closed, the normal pressure ratio $\pi C$ increases slightly behind the increase of the target pressure ratio $\pi C^*$. However, when at least one of the air bypass valve 29, the waste gate 42 and the variable flap 48 fails and is left opened, the failure pressure ratio $\pi C$ increases greatly behind the increase of the target pressure ratio $\pi C^*$. Thus, it is possible to detect the failure from a difference in a degree of the delay (the delay coefficient $\alpha$).

A current value $\pi C(n)$ of a pressure ratio is given by the following equation using the last value $\pi C(n-1)$, the target pressure ratio $\pi C^*$ and the delay coefficient $\alpha$ (an instantaneous value).

$$\pi C(t) = \alpha \times \pi C^*(t-\Delta t) + (1-\alpha) \times \pi C(t-\Delta t)$$

When this equation is solved for the delay coefficient $\alpha$ (the instantaneous value), the following equation is obtained.

$$\alpha = \{\pi C(t) - \pi C(t-\Delta t)\} / \{\pi C^*(t-\Delta t) - \pi C(t-\Delta t)\}$$

Figure 8:
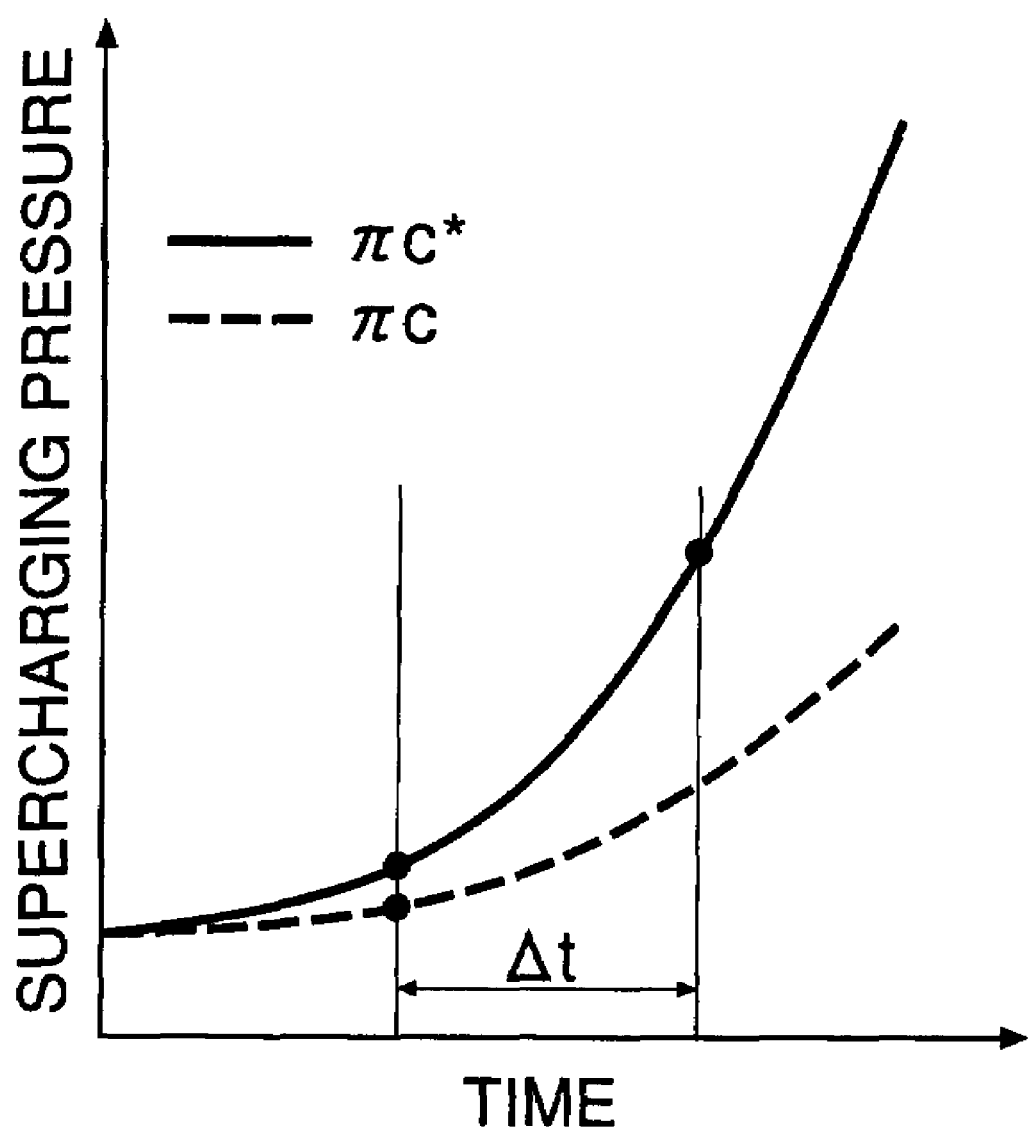
FIG. 8 is a graph showing an interval of calculation of the pressure ratio $\pi C$.
Figure 9:
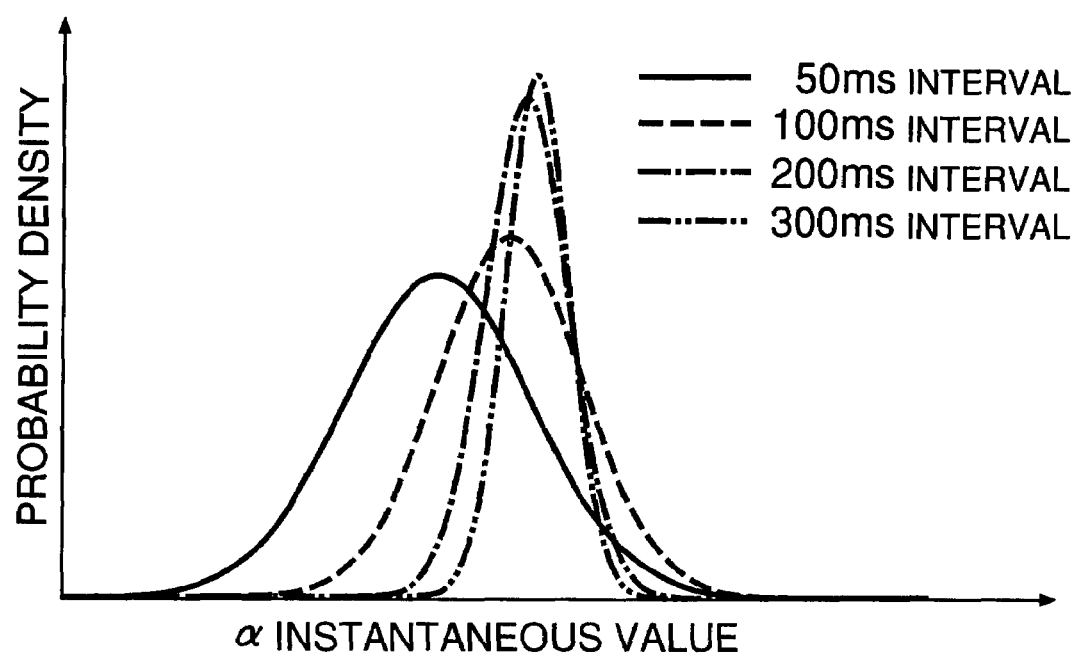
FIG. 9 is a graph showing dispersion due to intervals of calculation of the pressure ratio $\pi C$.

Here, $\Delta t$ is a time difference between calculations of the current value and the last value. When $\Delta t$ is small, an amount of change in the pressure ratio $\pi C$ is small, and thus the delay coefficient $\alpha$ is susceptible to an influence of external disturbance. When $\Delta t$ is equal to or larger than 200 milliseconds, a distribution of the delay coefficient $\alpha$ stabilizes, and thus $\Delta t$ is set to 200 milliseconds in this embodiment (see FIGS. 8 and 9).

The pressure ratio $\pi C$ cannot be equal to or larger than the target pressure ratio $\pi C^*$. Thus, the delay coefficient $\alpha$ (the instantaneous value) is smaller than 1. The delay coefficient $\alpha$ (the instantaneous value) will never be a negative value. Therefore, a limit processing for establishing $0 < \alpha < 1$ is performed in order to prevent the influence of external disturbance.

The delay coefficient $\alpha$ (the instantaneous value) is integrated a predetermined number of times, and the integrated value is divided by the predetermined number of times to obtain the delay coefficient $\alpha$ (an average value). Then, the delay coefficient $\alpha$ (the average value) is compared with a threshold. When a relationship "the delay coefficient $\alpha$ (the average value)$\leq$the threshold" is established, i.e., when the pressure ratio $\pi C$ delays in reaching the target pressure ratio $\pi C^*$, it is determined that there occurs a failure where any of the air bypass valve 29, the wastegate 42 and the variable flap 48 opens rather than closing.

The operation will be further described with reference to flowcharts of FIGS. 10 to 13.

Figure 10:
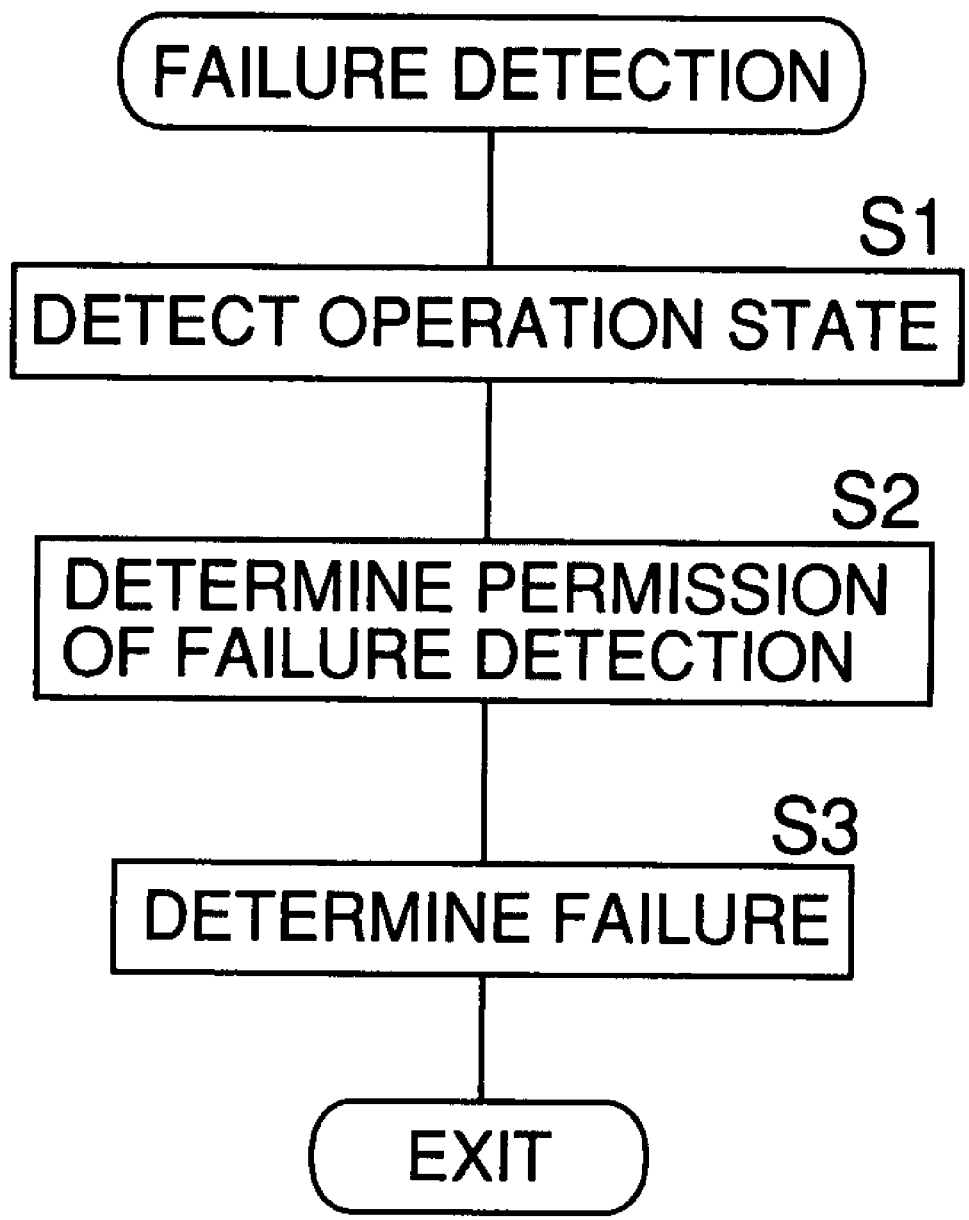
FIG. 10 is a flowchart of a main routine.

First, in step S1 of a main routine shown in FIG. 10, detection of an operation state of the engine E is performed, i.e., acquisition of data necessary for failure detection is performed. In the next step S2, it is determined whether predetermined conditions for determining the permission of failure detection for the turbocharger 25 are satisfied. In the next step S3, the failure determination is performed for the turbocharger 25.

Figure 11:
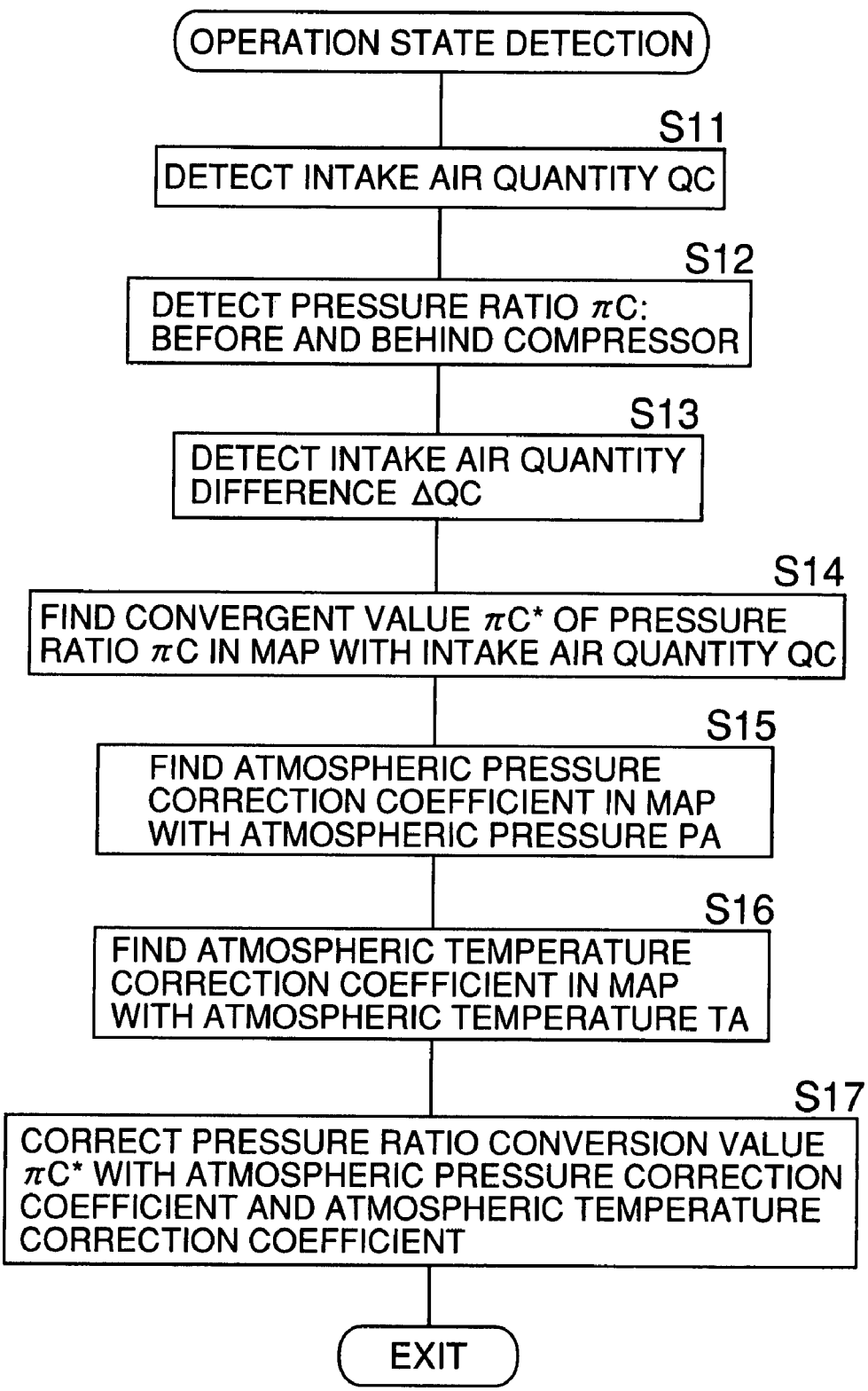
FIG. 11 is a flowchart of an operation state detection routine.

A subroutine of step S1 (operation state detection) in FIG. 10 will be described with reference to FIG. 11.

First, in step S11, the intake-air-quantity detecting means Sc detects the intake air quantity QC of the engine E. In the next step S12, the pressure ratio $\pi C$, which is a pressure ratio between pressures before and behind the compressor 25a, is calculated according to $\pi C = P2/P1$. The P2 pressure is a pressure in the upstream section 21a of the first intake passage 21, and can be calculated by adding a pressure loss of the intercooler 26 to the P3 pressure in the downstream section 21b of the first intake passage 21. The P1 pressure can be calculated by subtracting a pressure loss of the air cleaner 24 from the atmospheric pressure PA.

Figure 14:
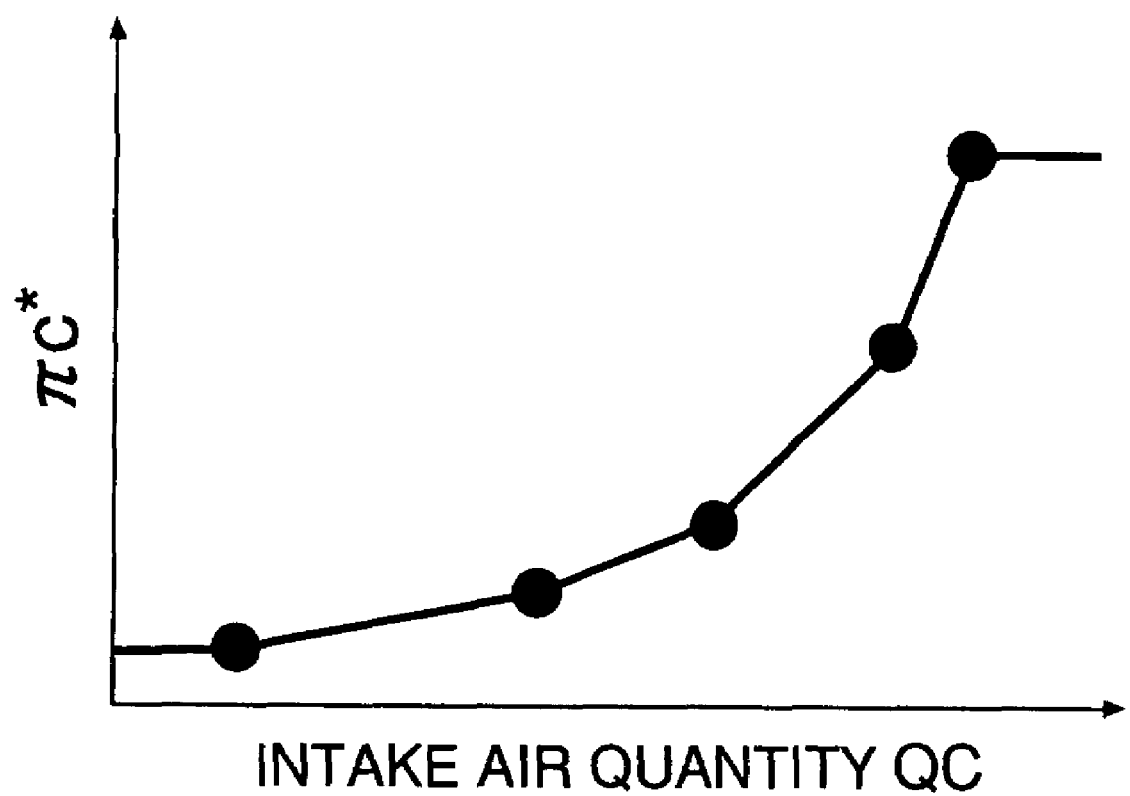
FIG. 14 is a map for finding the target pressure ratio $\pi C^*$ with an intake air quantity QC.
Figure 15:
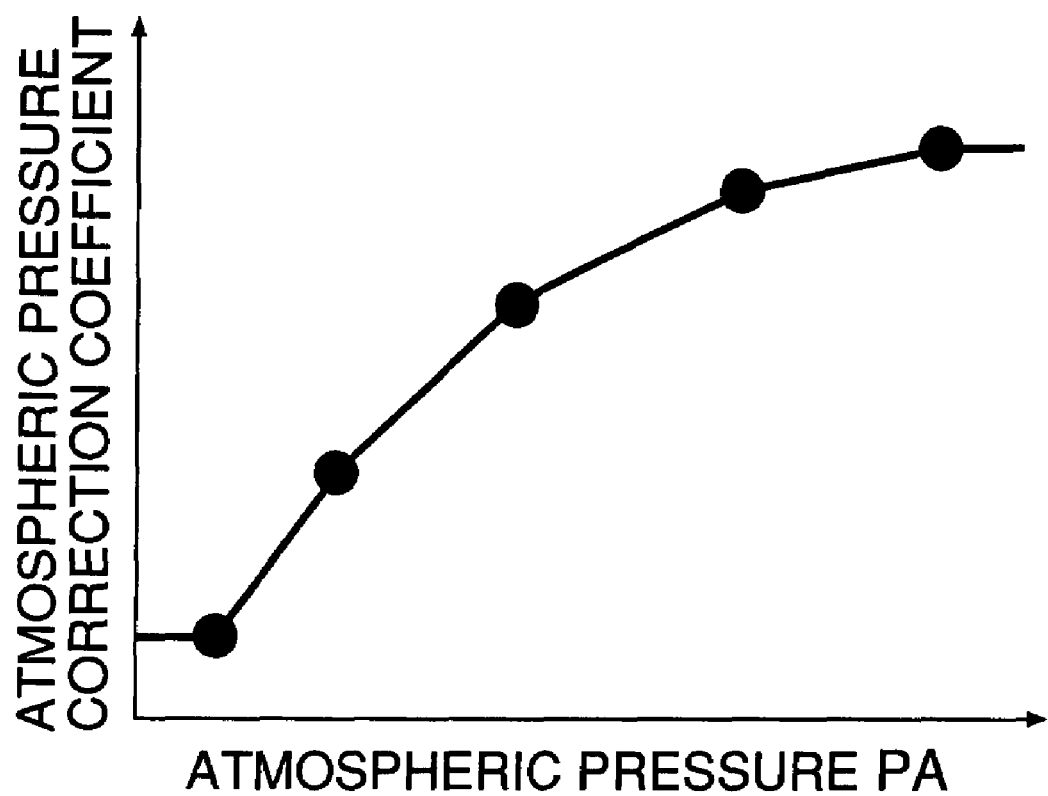
FIG. 15 is a map for finding an atmospheric pressure correction coefficient with an atmospheric pressure PA.
Figure 16:
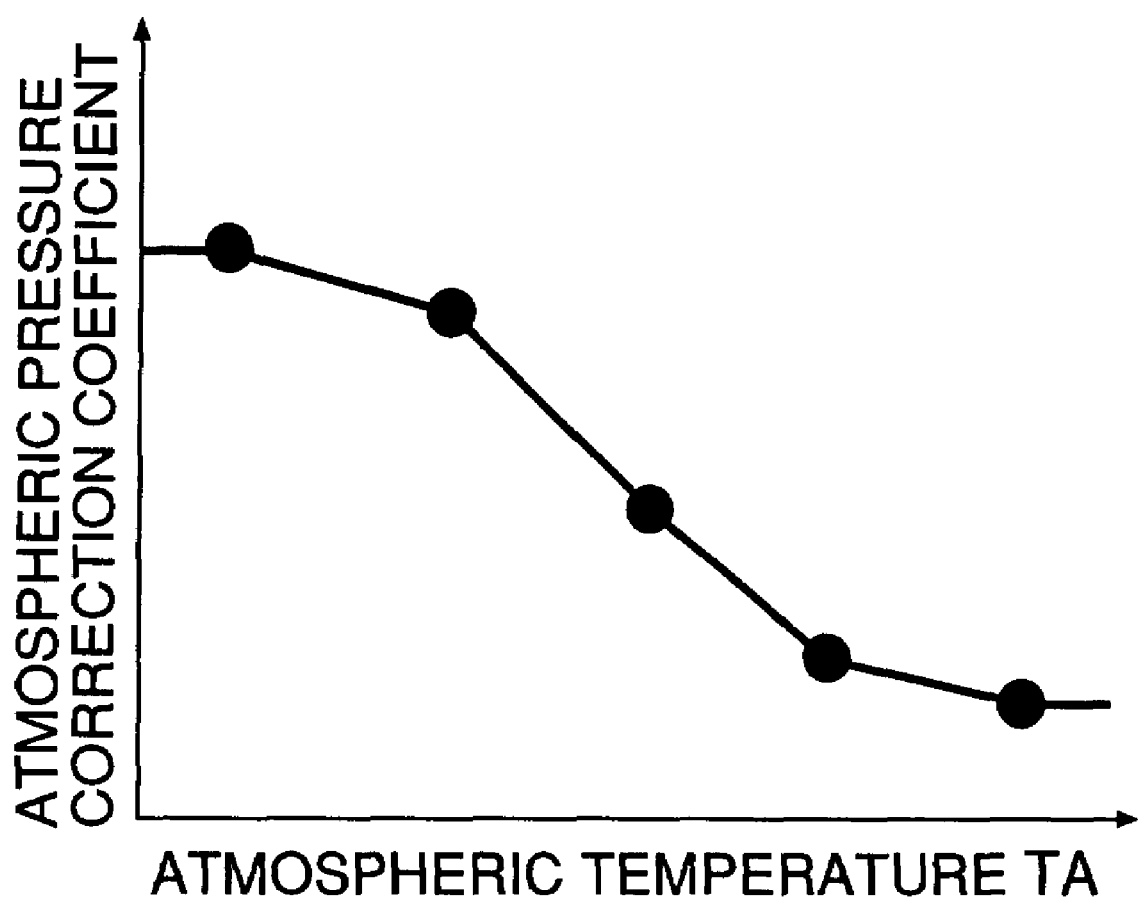
FIG. 16 is a map for finding an intake temperature correction coefficient with an intake air temperature TA.

In the next step S13, an intake air quantity change amount $\Delta QC$, which is an amount of change in the intake air quantity QC, is calculated as a difference obtained by subtracting the last value from the current value. In the next step S14, the target pressure ratio $\pi C^*$ is searched in a map of FIG. 14 with the intake air quantity QC. An atmospheric pressure correction coefficient is searched in a map of FIG. 15 with the atmospheric pressure PA. In step S16, an intake temperature correction coefficient is searched in a map of FIG. 16 with intake air temperature TA. In step S17, the target pressure ratio $\pi C^*$ is corrected using the atmospheric pressure correction coefficient and the intake air temperature correction coefficient. This correction is performed by the convergent-value correcting means M7 (see FIG. 5).

Figure 12:
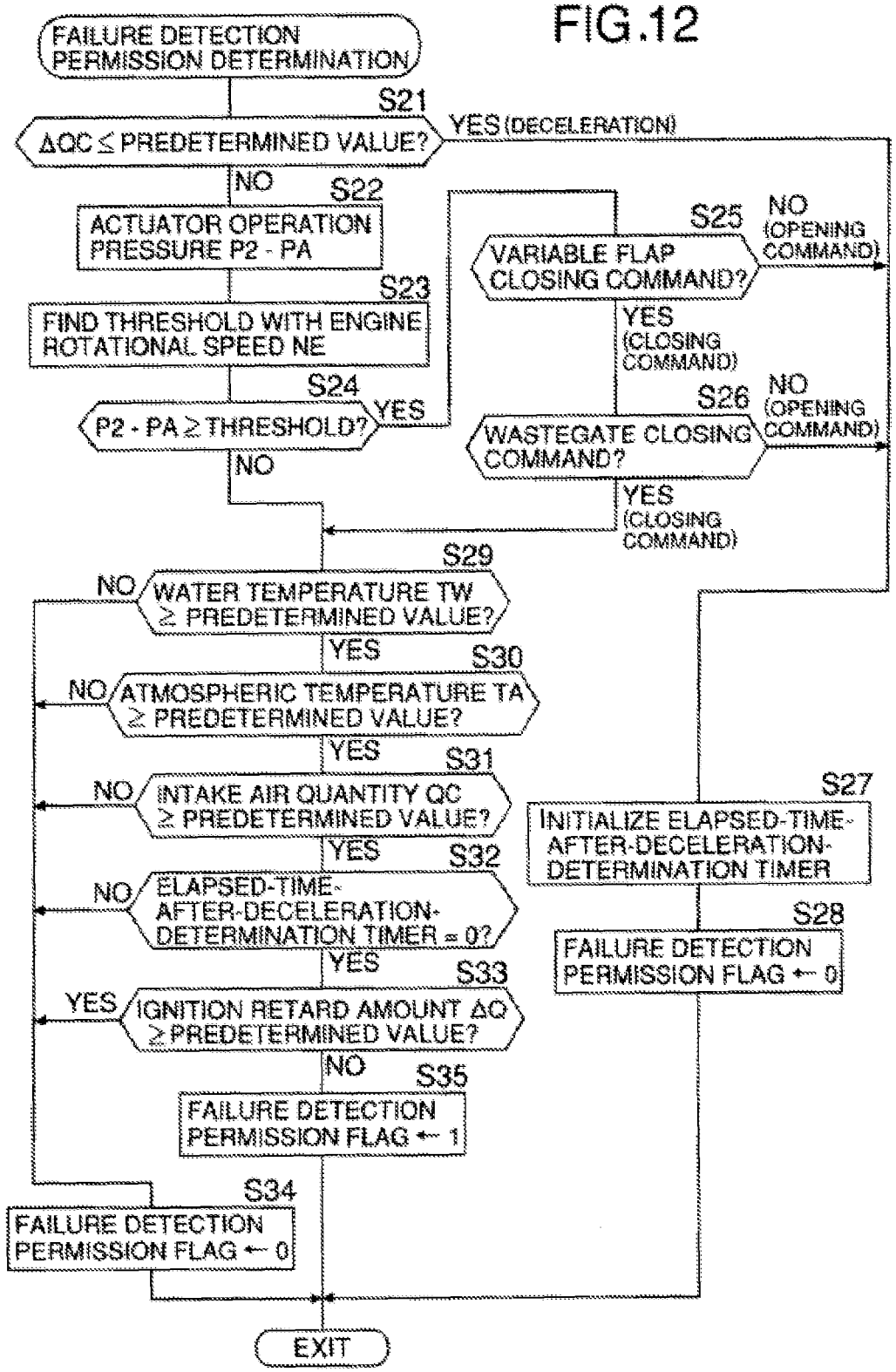
FIG. 12 is a flowchart of a failure detection permission determination routine.

A subroutine of step S2 (a subroutine of the failure detection permission determination) in FIG. 10 will be described with reference to FIG. 12.

First, in step S21, the intake air quantity change amount $\Delta QC$, which is the amount of change in the intake air quantity QC, is compared with a predetermined value. If the intake air quantity change amount $\Delta QC$ is equal to or smaller than the predetermined value, i.e., the turbocharger 25 is decelerating, a deceleration time determination timer is initialized in step S27, and a failure detection permission flag is reset to "0" in step S28 to cancel the failure detection. The acceleration-state determining means M1 (see FIG. 5) determines whether the turbocharger 25 is in a deceleration state or an acceleration state. If the turbocharger 25 is in the deceleration state, the failure-detection permitting means M3 (see FIG. 5) cancels the failure detection.

Figure 17:
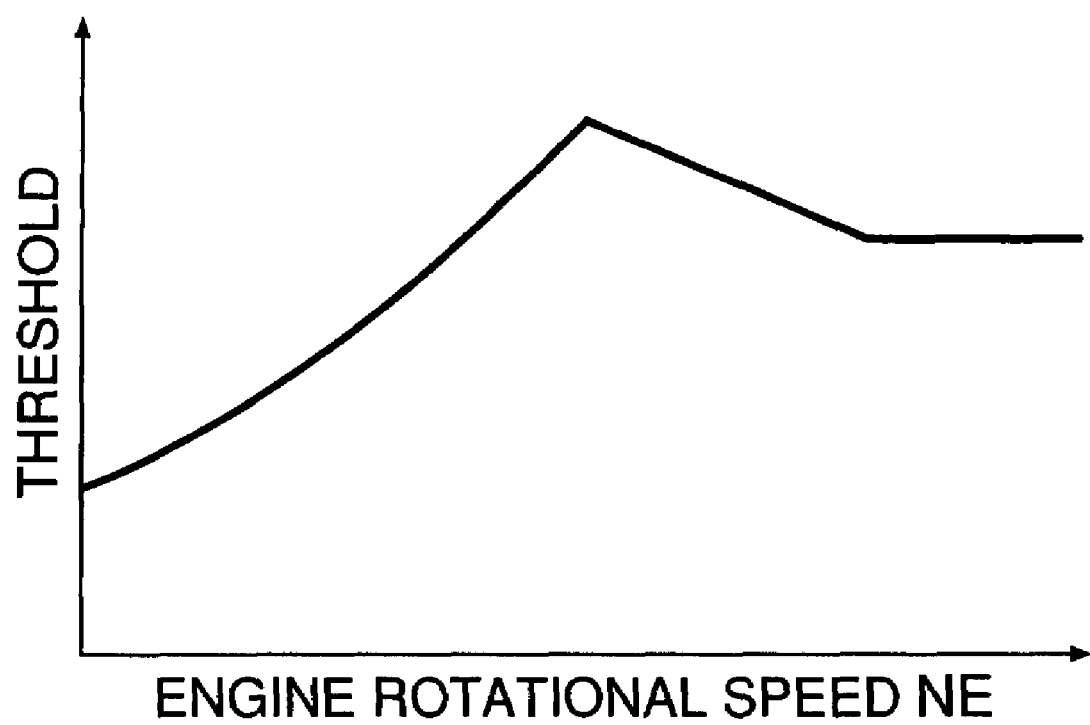
FIG. 17 is a map for finding a threshold with an engine rotational speed.

On the other hand, when the intake air quantity change amount ΔQC exceeds the predetermined value in step S21, i.e., the turbocharger 25 is accelerating, a pressure difference P2−PA between the P2 pressure in the upstream section 21a of the second intake passage 21 and the atmospheric pressure PA is calculated in step S22, namely, an actuation pressure for actuating the actuators 43 and 49 of the wastegate 42 and the variable flap 48 is calculated. In the next step S23, a threshold is searched in a map of FIG. 17 with the engine rotational speed NE detected by the engine-rotational-speed detecting means Sf. As a result, if the pressure difference P2−PA is equal to or larger than the threshold in step S24, i.e., the actuators 43 and 49 of the wastegate 42 and the variable flap 48 are operable, and if a command to the variable flap 48 is an opening command in step S25 or a command to the wastegate 42 is an opening command in step S26, at least one of the wastegate 42 and the variable flap 48 is open and the failure detection cannot be performed. Thus, the procedure proceeds to steps S27 and S28 to cancel the failure detection.

If the pressure difference P2−PA is smaller than the threshold in step S24, i.e., the actuators 43 and 49 of the wastegate 42 and the variable flap 48 are inoperable; or if the pressure difference P2−PA is equal to or larger than the threshold in step S24, i.e., the actuators 43 and 49 of the wastegate 42 and the variable flap 48 are operable, but the command to the variable flap 48 is a closing command in step S25 and the command to the wastegate 42 is a closing command in step S26, it is determined that both the wastegate 42 and the variable flap 48 are open, and the procedure proceeds to step S29.

The supercharging-pressure-control-state determining means M2 (see FIG. 5) determines whether both the wastegate 42 and the variable flap 48 are open.

If the cooling water temperature TW detected by the cooling-water-temperature detecting means Se is lower than a predetermined value in step S29, or if the intake air temperature TA detected by the intake-temperature detecting means Sd is lower than a predetermined value in step S30, or if the intake air quantity QC detected by the intake-air-quantity detecting means Sc is smaller than a predetermined value in step S31, i.e., the turbocharger 25 is not in the acceleration state, or if an elapsed-time-after-deceleration-determination timer is not yet time-out in step S32, or if an ignition retard amount detected by the ignition-retard-amount detecting means Sg is equal to or larger than a predetermined value in step S33, it is determined that conditions for performing the failure detection for the wastegate 42 and the variable flap 48 are not satisfied, and the procedure proceeds to step S34 to cancel the failure detection.

A reason for the above-described procedure is that, if the intake air quantity QC is smaller than the predetermined value, the engine E is in a low load state which is an inappropriate condition for performing the failure detection for the turbo charger 25. This determination is performed by the supercharging-pressure-control-state determining means M2 (see FIG. 5). Another reason is that, if a predetermined time has not elapsed after the deceleration determination, the pressure ratio πC is unstable because of inertia of the turbocharger 25. Still another reason is that, if the ignition retard amount is equal to or larger than the predetermined value, exhaust energy with respect to an engine load increases, and thus the target pressure ratio πC* changes.

On the other hand, if the cooling water temperature TW is equal to or higher than the predetermined value in step S29, and if the intake air temperature TA is equal to or higher than the predetermined value in step S30, and if the intake air quantity QC is equal to or larger than the predetermined value in step S31, and if the turbocharger 25 is in the acceleration state, and if the elapsed-time-after-deceleration-determination timer is already time out in step S32, and if the ignition retard amount is equal to or larger than the predetermined value in step S33, it is determined that all the air bypass valve 29, the wastegate 42 and the variable flap 48 are closed and thus the conditions for performing the failure detection are satisfied in step S35 to permit the failure detection.

Figure 13:
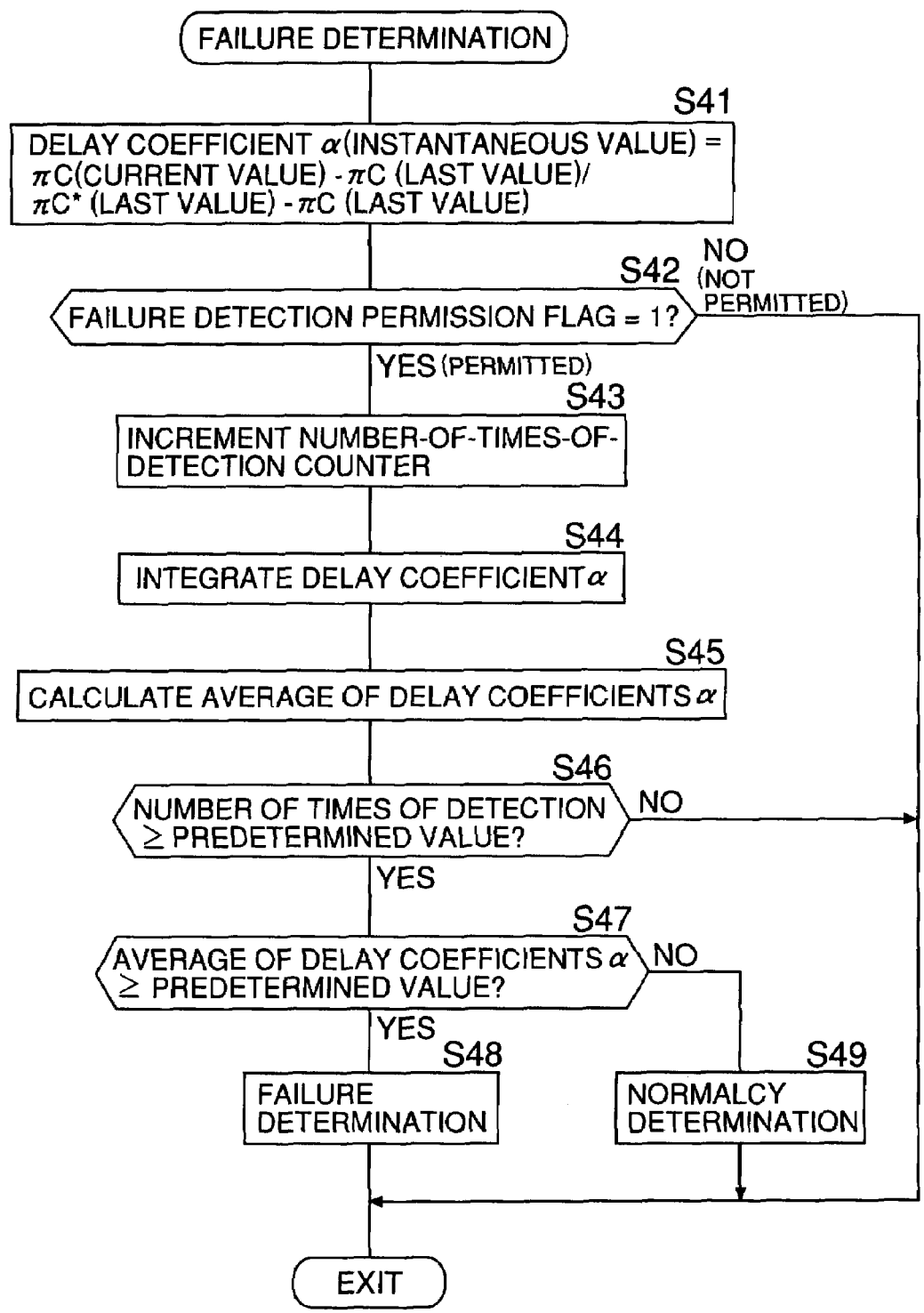
FIG. 13 is a flowchart of a failure determination routine.

A subroutine of step S3 (the failure determination) in FIG. 10 will be described with reference to FIG. 13.

First, in step S41, the electronic control the delay coefficient α (the instantaneous value) is calculated according to the following equation.

$$\alpha = \{\pi C(t) - \pi C(t-\Delta t)\} / \{\pi C^*(t-\Delta t) - \pi C(t-\Delta t)\}$$

If the failure detection permission flag is "1" in the next step S42, i.e., the failure detection is permitted, a number-of-times-of-detection counter is incremented in step S43. In step S44, the delay coefficient α (the instantaneous value) is integrated. In step S45, the delay coefficient α (the average value) is divided by the number of times of the integration. This calculation of the delay coefficient α is performed by the delay-coefficient calculating means M5 (see FIG. 5).

Figure 18:
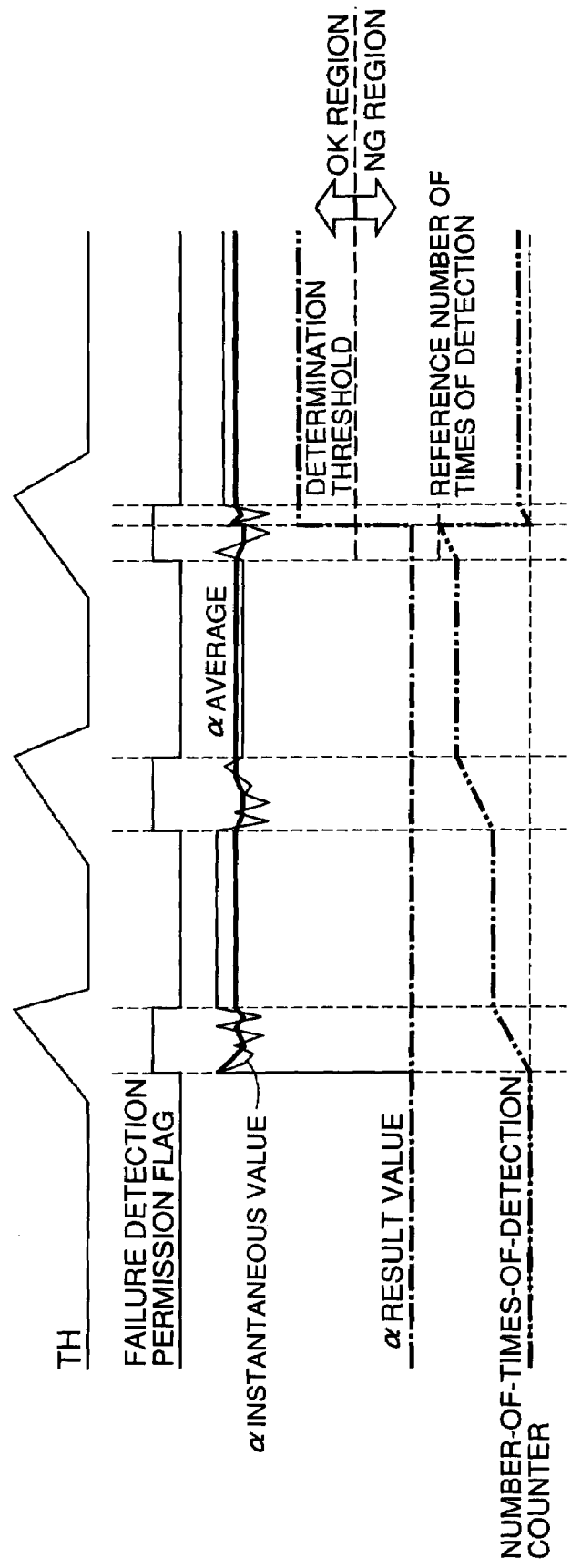
FIG. 18 is a time chart of detection failure.

If the number of times of detection counted by the number-of-times-of-detection counter reaches a predetermined value in step S46, and if the delay coefficient α (the average value) is equal to or larger than a predetermined value in step S47, normalcy determination is performed in step S48. If the delay coefficient α (the average value) is smaller than the predetermined value in step S47, the failure determination is performed in step S49 (see a time chart in FIG. 18). This failure determination is performed by the failure determining means M6 (see FIG. 5).

As described above, if the engine load (the intake air quantity QC) is equal to or larger than the predetermined value, i.e., the turbocharger 25 is in the acceleration state, and the bypass valve 29, the wastegate 42 and the variable flap 48 are closed, i.e., the turbocharger 25 is in a maximum supercharging pressure control state, namely, if the delay coefficient α of the turbocharger calculated from the actual pressure ratio πC and the target pressure ratio πC* indicates a value peculiar to the turbocharger 25, it is determined, on the basis of the delay coefficient α, that a valve opening failure of the bypass valve 29, the wastegate 42 and the variable flap 48 has occurred. Thus, it is possible to secure a high failure detection accuracy even when the engine load suddenly changes to cause a delay in response of a supercharging pressure.

The embodiment of the present invention has been described above, but various changes in design may be made without departing from the subject matter of the present invention.

For example, in the embodiment, the bypass valve 29, the wastegate 42 and the variable flap 48 are described as examples of the supercharging-pressure control means. However, the supercharging-pressure control means is not limited thereto.

In the embodiment, the intake air quantity QC is described as an example of the engine load. However, the engine load is not limited thereto.

The supercharging pressure of the present invention is not limited to the pressure ratio πC of the embodiment, and may be a supercharging pressure not represented as a ratio.

Instead of correcting the target pressure ratio πC* according to the atmospheric pressure PA and the intake air temperature TP, the target pressure ratio πC* may be corrected according to at least one of the atmospheric pressure PA, the intake air temperature TP, an exhaust gas pressure and an exhaust gas temperature.

What is claimed is:

1. A failure detecting device for supercharging-pressure control means in a supercharging device of an engine, the supercharging device comprising:
    a turbocharger for supercharging the engine;
    supercharging-pressure control means for controlling a supercharging pressure in a supercharging intake air passage downstream of the turbocharger;
    engine-load detecting means for detecting an engine load; and
    supercharging-pressure detecting means for detecting the supercharging pressure in the supercharging intake air passage,
    wherein the failure detecting device comprises:
    acceleration-state determining means for determining whether a turbine is in an acceleration state on the basis of the engine load detected by the engine-load detecting means;
    supercharging-pressure-control-state determining means for determining whether the supercharging-pressure control means is in a maximum supercharging pressure control state for maximizing the supercharging pressure in the supercharging intake air passage;
    failure-detection permitting means for permitting failure detection for the supercharging-pressure control means, when the engine-load detecting means detects an engine load equal to or larger than a predetermined value, the acceleration-state determining means determines that the turbine is in the acceleration state, and the supercharging-pressure-control-state determining means determines that the supercharging-pressure control means is in the maximum supercharging pressure control state;
    convergent-value calculating means for calculating a convergent value of the supercharging pressure on the basis of the engine load detected by the engine-load detecting means, when the failure-detection permitting means permits the failure detection;
    delay-coefficient calculating means for calculating a delay coefficient of the turbocharger on the basis of the supercharging pressure detected by the supercharging-pressure detecting means and the convergent value of the supercharging pressure calculated by the convergent-value calculating means; and
    failure determining means for determining whether a failure of the supercharging-pressure control means has occurred on the basis of the delay coefficient calculated by the delay-coefficient calculating means.

2. The failure detecting device for supercharging-pressure control means in a supercharging device of an engine according to claim 1, wherein the engine-load detecting means detects the engine load on the basis of an intake air quantity of the engine; and the failure detecting device further comprises convergent-value correcting means for correcting the convergent value of the supercharging pressure according to at least one of an atmospheric pressure, an intake air temperature, an exhaust gas pressure, and an exhaust gas temperature.

3. The failure detecting device for supercharging-pressure control means in a supercharging device of an engine according to claim 1, wherein the failure-detection permitting means cancels the failure detection for the supercharging-pressure control means when a retard amount in an ignition timing of the engine is equal to or larger than a predetermined value.

4. The failure detecting device for supercharging-pressure control means in a supercharging device of an engine according to claim 1, wherein the failure-detection permitting means cancels the failure detection when the acceleration-state determining means determines that the turbine is in a deceleration state.

5. The failure detecting device for supercharging-pressure control means in a supercharging device of an engine according to claim 1, wherein the failure-detection permitting means cancels the failure detection by the acceleration-state determining means until a predetermined time elapses after the determination as to whether the turbine is in the deceleration state is finished.

6. A failure detector for supercharging-pressure controller in a supercharging device of an engine, the supercharging device comprising:
    a turbocharger for supercharging the engine;
    a supercharging-pressure controller for controlling a supercharging pressure in a supercharging intake air passage downstream of the turbocharger;
    an engine-load detector for detecting an engine load; and
    a supercharging-pressure detector for detecting the supercharging pressure in the supercharging intake air passage,
    wherein the failure detector comprises:
    an acceleration-state determiner for determining whether a turbine is in an acceleration state on the basis of the engine load detected by the engine-load detector;
    a supercharging-pressure-control-state determiner for determining whether the supercharging-pressure controller is in a maximum supercharging pressure control state for maximizing the supercharging pressure in the supercharging intake air passage;
    a failure-detection permitting device for permitting failure detection for the supercharging-pressure controller, when the engine-load detector detects an engine load equal to or larger than a predetermined value, the acceleration-state determiner determines that the turbine is in the acceleration state, and the supercharging-pressure-control-state determiner determines that the supercharging-pressure controller is in the maximum supercharging pressure control state;
    a convergent-value calculator for calculating a convergent value of the supercharging pressure on the basis of the engine load detected by the engine-load detector, when the failure-detection permitting device permits the failure detection;
    a delay-coefficient calculator for calculating a delay coefficient of the turbocharger on the basis of the supercharging pressure detected by the supercharging-pressure detector and the convergent value of the supercharging pressure calculated by the convergent-value calculator; and
    a failure determiner for determining whether a failure of the supercharging-pressure controller has occurred on the basis of the delay coefficient calculated by the delay-coefficient calculator.

7. The failure detector for supercharging-pressure controller in a supercharging device of an engine according to claim 6, wherein the engine-load detector detects the engine load on the basis of an intake air quantity of the engine; and the failure detector further comprises a convergent-value correcting device for correcting the convergent value of the supercharging pressure according to at least one of an atmospheric pressure, an intake air temperature, an exhaust gas pressure, and an exhaust gas temperature.

8. The failure detector for supercharging-pressure controller in a supercharging device of an engine according to claim 6, wherein the failure-detection permitting device cancels the failure detection for the supercharging-pressure controller when a retard amount in an ignition timing of the engine is equal to or larger than a predetermined value.

9. The failure detector for supercharging-pressure controller in a supercharging device of an engine according to claim 6, wherein the failure-detection permitting device cancels the failure detection when the acceleration-state determiner determines that the turbine is in a deceleration state.

10. The failure detector for supercharging-pressure controller in a supercharging device of an engine according to claim 6, wherein the failure-detection permitting device cancels the failure detection by the acceleration-state determiner until a predetermined time elapses after the determination as to whether the turbine is in the deceleration state is finished.

* * * * *